J. P. SPICER & T. INSULL.
Carriage-Axles.

No. 158,993.

Patented Jan. 19, 1875.

WITNESSES
Jas. L. Ewin
Henry Tanner

INVENTORS
John P. Spicer
Thomas Insull
By Knight Bros Attorneys

UNITED STATES PATENT OFFICE.

JOHN P. SPICER, OF MILESTOWN, AND THOMAS INSULL, OF PHILADELPHIA, ASSIGNORS TO THEMSELVES AND JAMES F. DOVEY, OF PHILADELPHIA, PENNSYLVANIA.

IMPROVEMENT IN CARRIAGE-AXLES.

Specification forming part of Letters Patent No. 158,993, dated January 19, 1875; application filed December 14, 1874.

*To all whom it may concern:*

Be it known that we, JOHN P. SPICER, of Milestown, Montgomery county, and THOMAS INSULL, of the city and county of Philadelphia, both in the State of Pennsylvania, have invented a new and useful Improvement in Axles and Boxes for Vehicles, of which the following is a specification:

Our invention consists, first, in providing the arm or spindle of an axle with a sleeve adapted to be applied or removed while the wheel is in position. The said sleeve receives the friction from the box of the wheel, and may be made to contain a chamber for the reception of lubricating material, which is delivered to the wearing-surface through radial apertures in the sleeve, preferably, near its central part. The invention further consists in constructing the said sleeve with a screw-thread by which it is secured to the axle-arm, and with a collar on its outer end for the purpose of retaining the wheel on the axle. The invention further consists in combining with a sleeve, screwed upon the axle-arm for the purpose of retaining the wheel, as aforesaid, a nut screwed upon the extremity of the arm in the opposite direction, so as to constitute a jam-nut in connection with the threaded sleeve, and effectually prevent the unscrewing of the latter. The invention further consists in combining with the removable sleeve, constituting the wearing-surface of the axle, and a wheel-box within which such removable sleeve fits, a broad collar upon the axle proper, adapted to rest within the hub of the wheel when the sleeve is removed.

Figure 1:
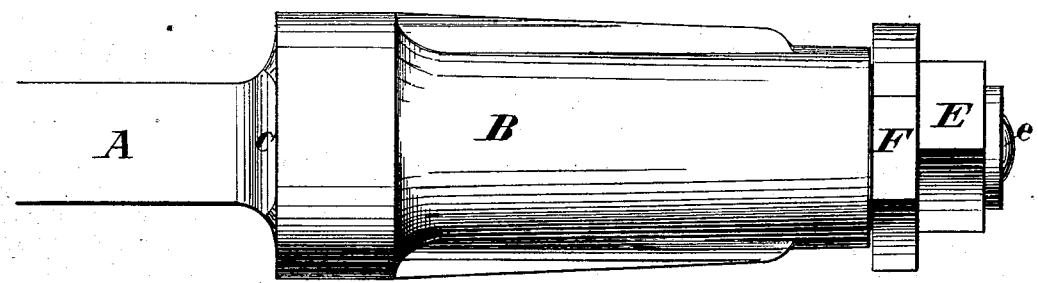
Figure 2:
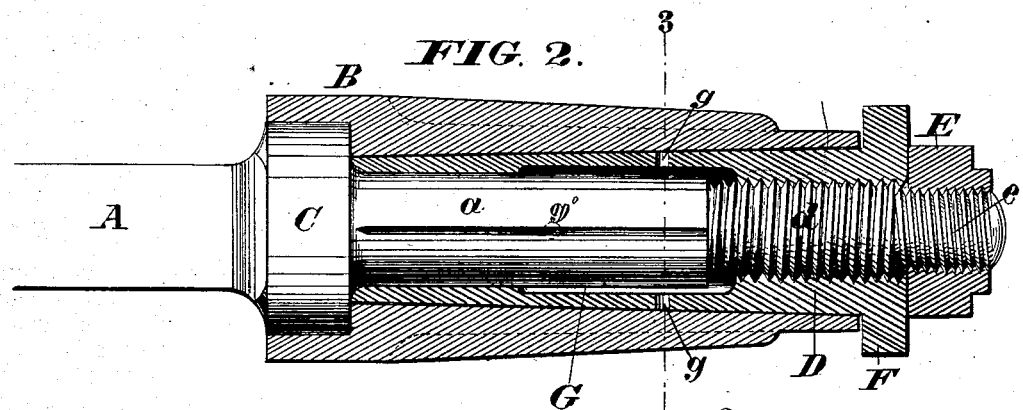
Figure 3:
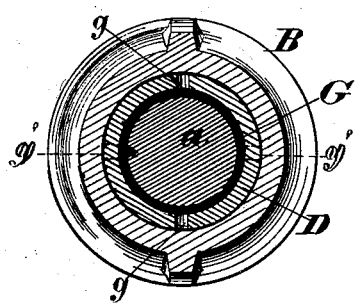
Figure 4:
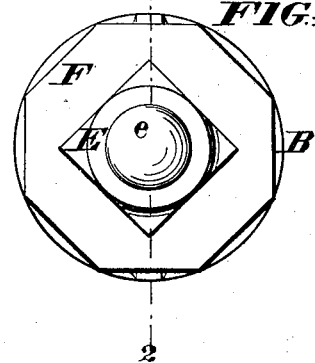

In the accompanying drawings, Figure 1 is a front elevation of a hub-box and one end of an axle illustrating our invention. Fig. 2 is a longitudinal section of the hub-box, removable sleeve, and jam-nut applied to an axle which is shown in elevation. Fig. 3 is a transverse section on the line 3 3, Fig. 2. Fig. 4 is an end elevation.

A represents a portion of the axle of a vehicle, and B a hub-box applied thereto, fitting upon a collar, C, which forms the inner end bearing of the box, and is of sufficient width to support the weight of the vehicle while the screw-sleeve, hereinafter described, is removed. The extremity of the arm $a$ of the axle A is formed with a thread, $e$, which, in the present illustration, constitutes a right-hand screw, and the adjacent portion of the arm is threaded in the opposite direction, as shown at $d$, which, in the present illustration, is a left-hand screw. D represents a removable sleeve adapted to fit over the arm $a$, and threaded at its extremity to fit the screw $d$. The outer end of the sleeve D is formed with a collar, F, serving to retain the wheel upon the axle. Within the central part of the sleeve D is a cavity, G, for the reception of oil or grease, which, when the carriage is running, is delivered through apertures $g\ g'$ to the bearing-surfaces between the sleeve D and the box B. Owing to the inward taper of the interior of the box B, and the corresponding tapering form of the movable sleeve D, which taper facilitates the removal and insertion of the sleeve, the lubricating material, which is delivered at the central portion of the bearing-surfaces, will tend to work or flow, by its own gravity, toward each end of the box, that which is at the upper part working downward toward the collar C, and that which is at the lower part working downward toward the collar F.

The operation is as follows: If it be desired to grease or oil the wheels no jack is necessary. The outer nut, E, is first removed, and the nut $d$ is then readily turned out of the wheel, leaving the axle resting within the hub by its broad collar C, while the wheel rests upon the ground. The lubricating material having been introduced within the cavity G of the sleeve, the latter is reinserted within the hub of the wheel, and being screwed firmly home with its inner end against the collar C, the nut E is screwed on securely, jamming the sleeve D in position, while leaving the box perfectly free to turn.

It will now appear that any disposition of the sleeve D to unwind from its arm is effectually prevented by the jam-nut E, inasmuch as a screw-movement of the said sleeve turning the nut E in the same direction would tend to screw up the said nut more firmly against the end of the sleeve by reason of the reversal of their threads.

The sleeve D will be seen to completely protect the arm of the axle from wear. When the said sleeve is worn it can be replaced at trifling cost, being, preferably, made of cast-iron. The only wear upon any prominent part of the axle is borne by the collar C. This wear is comparatively trifling, but when such collars are worn out they can be repaired or replaced at a very small outlay compared with the cost of an entire axle.

We are aware that skeins or sleeves have before been secured to axles with screw-threads, so as to be detachable. Our invention differs from these in that our sleeve is so constructed and applied as to be removable while the wheel is in position on the axle, and so as to constitute the means of securing the wheel.

The following is claimed as new in this invention, namely:

1. The removable screw-sleeve D, in combination with a threaded axle-arm, $a$ $d$, on which it is screwed, and an outwardly-flaring box, B, within which it fits, substantially as set forth.

2. The construction of the removable tapering screw-sleeve D with a collar, E, for retaining the wheel on the axle, as set forth.

3. The combination, with the removable screw-sleeve D, to constitute the bearing-surface of the axle, of the nut E, applied to the axle with a thread in the opposite direction from that of the sleeve D, as set forth.

4. The combination of the broad bearing-collar C with the box B and removable sleeve D, as and for the purposes set forth.

JOHN P. SPICER.
THOMAS INSULL.

Witnesses:
JOHN D. MAIR,
THOMAS MASSEY.